(12) United States Patent
Nakashima et al.

(10) Patent No.: US 7,537,077 B2
(45) Date of Patent: May 26, 2009

(54) SHROUD OF A VEHICLE

(75) Inventors: Takehiro Nakashima, Akashi (JP);
Yoshihiro Masuda, Kobe (JP);
Nobuhiko Kurokawa, Aioi (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 508 days.

(21) Appl. No.: 11/396,326

(22) Filed: Mar. 31, 2006

(65) Prior Publication Data

US 2006/0254844 A1 Nov. 16, 2006

(30) Foreign Application Priority Data

Apr. 1, 2005 (JP) ............................. 2005-106365

(51) Int. Cl.
*B62K 11/00* (2006.01)
(52) U.S. Cl. ...................... 180/229; 180/68.4; 180/68.6
(58) Field of Classification Search ................ 180/219, 180/229, 196, 68.4, 68.6; 280/285
See application file for complete search history.

(56) References Cited

U.S. PATENT DOCUMENTS

| 5,715,904 A | * | 2/1998 | Takahashi et al. ............ 180/229 |
| 6,695,089 B2 | * | 2/2004 | Adachi et al. ............... 180/311 |
| 6,736,230 B2 | * | 5/2004 | Yokomizo ................... 180/219 |

FOREIGN PATENT DOCUMENTS

| JP | 05-085440 | | 4/1993 |
| JP | 06-321153 | | 11/1994 |
| JP | 06321153 A | * | 11/1994 |
| JP | 2002-321676 | | 11/2002 |
| JP | 2002321676 A | * | 11/2002 |
| JP | 2004-123092 | | 4/2004 |

\* cited by examiner

*Primary Examiner*—Paul N Dickson
*Assistant Examiner*—Jacob Knutson
(74) *Attorney, Agent, or Firm*—Alleman Hall McCoy Russell & Tuttle LLP (57) ABSTRACT

A shroud, typically of an off-road motorcycle is provided. The motorcycle includes a fuel tank provided in an upper front portion of the motorcycle body. The shroud structure includes an upper shroud that extends along a side face of the fuel tank and covers the fuel tank, and a lower shroud disposed below the upper shroud. The upper and lower shrouds are detachably coupled to each other.

16 Claims, 12 Drawing Sheets

SHROUD OF A VEHICLE

CROSS-REFERENCE TO RELATED APPLICATION

This application is based on and claims priority to Japanese Patent Application No. 2005-106365, the entire disclosure of which is incorporated herein by reference.

TECHNICAL FIELD

The present invention relates to a shroud structure of a vehicle, particularly, to a shroud for an off-road motorcycle, more particularly, to a shroud that covers a fuel tank and a radiator.

BACKGROUND OF THE INVENTION

Japanese Unexamined Patent Publication No. HEI 05-85440 discloses an off-road type, especially a motocross-type, motorcycle that typically is provided with a cover, also referred to as a "shroud." The shroud typically protects side faces of a fuel tank and a radiator. The fuel tank may be molded from synthetic resin in order to reduce weight for races. The radiator may be disposed below the fuel tank.

Recently, in addition to the original protection purposes as described above, a design nature of the shroud also has become more important and, thus, shrouds with more complicated shapes and more color variations are increased in number.

As the shroud shape is made more complicated, top edges of an operator's boots may be easily caught by the shroud edge, and a smooth change of a riding position or riding posture is interrupted (for example, refer to Japanese Unexamined Patent Publication No. HEI 06-321153). Alternatively, as the shroud color is made more complicated, for example, color stickers may not be able to reproduce quick, frequent, or small design changes, and color paint may have unevenness. Further, the top edges of the operator's boots typically scratch the color stickers or the paint applied to a particular portion of the shroud, which typically is a lower portion of the shroud. Thus, the color stickers and the paint easily come off.

Meanwhile, since the operator may fall from the motorcycle during a motocross race, the shroud lower portion may be broken particularly easily. As for this reason, this kind of shroud has a relatively large covering area in order to protect the fuel tank as well as the radiator. Therefore, it is uneconomical to replace the whole shroud when only the lower portion is damaged (for example, refer to Japanese Unexamined Patent Publication Nos. 2002-321676 and 2004-123092).

BRIEF SUMMARY OF THE INVENTION

The present invention addresses the above-mentioned conditions to provide a shroud of a vehicle with an improved design flexibility, and that is economical without need of replacing the whole shroud when a portion of the shroud is damaged.

According to one aspect of the invention, an off-road motorcycle is provided with a fuel tank disposed in an upper front portion of the motorcycle body. A shroud of the motorcycle includes an upper shroud that extends along a side face of the fuel tank and covers a side face of the fuel tank, and a lower shroud disposed below the upper shroud. The upper and lower shrouds may be detachably coupled to each other.

Since the shroud includes a plurality of shroud parts, the shroud may be improved in design flexibility, and is economical without need of replacing the whole shroud when a portion of the shroud is damaged.

The motorcycle may further include a radiator disposed below the fuel tank. The lower shroud may cover a side face of the radiator.

The motorcycle may include a head pipe, a pair of main pipes, a down tube, a pair of lower frames, and a cross pipe. The pair of main pipes may be coupled to the head pipe at front ends thereof, and may extend in rear and lower directions so as be spaced apart from each other. The down tube may be coupled to the head pipe at a front end thereof, and may extend in a lower direction. The pair of lower frames may be coupled to a lower end portion of the down tube in a front end portion thereof, extend in a rear direction, and may be coupled to rear end portions of the pair of main pipes. The cross pipe may couple an intermediate portion of the down tube to intermediate portions of the pair of main pipes. The radiator may be disposed along the down tube. The fuel tank may be disposed in a space formed by the pair of main pipes, the down tube, and the cross pipe. The upper shroud may cover an upper portion of the radiator and substantially the whole side face of the fuel tank, traversing the main pipe. The lower shroud may extend rearward from a lower portion of the radiator along the cross pipe, traversing the down tube.

The coupled portion of the upper and lower shrouds may extend substantially in the front-and-rear direction.

The upper and lower shrouds may be coupled to each other in front portions thereof. The upper and lower shrouds may be provided with a gap. The gap may be formed in rear portions of the upper and lower shrouds so that the upper and lower shrouds may be spaced apart from each other in the up-and-down direction.

A portion of the main pipe corresponding to the gap may be exposed to the shroud exterior and form substantially a continuous surface with the surface of the shroud.

The gap may be configured to have a sufficient size that is able to discharge air flowing from a space surrounded by the shroud to the shroud exterior through the radiator.

The motorcycle may further include a straddle seat arranged behind the fuel tank, an engine disposed below the seat, and a pair of footrests disposed below and behind the engine. The upper shroud may be arranged in a position at which an operator of the motorcycle knee-grips the fuel tank through the upper shroud in a regular riding posture in which the operator sits on the seat, and places his/her legs on the footrests. The lower shroud may be arranged in a position at which a top edge of a boot which the operator wears avoids contact with a lower edge of the lower shroud when the operator extends his/her leg forward from the regular riding posture.

According to another aspect of the invention, a shroud may be attached to a vehicle other than an off-road motorcycle, and the shroud may include more than two parts. The shroud parts may be detachably coupled to each other.

The coupled portion of the shroud parts is formed as an overlapped portion of the shroud parts, and the coupled portion is detachably coupled by screws.

The above and further objects and features of the invention will more fully be apparent from the following detailed description with accompanying drawings.

DETAILED DESCRIPTION OF THE INVENTION

Hereinafter, an embodiment of a shroud of an off-road motorcycle as one example of a vehicle according to the present invention will be explained, referring to attached drawings.

Figure 1:
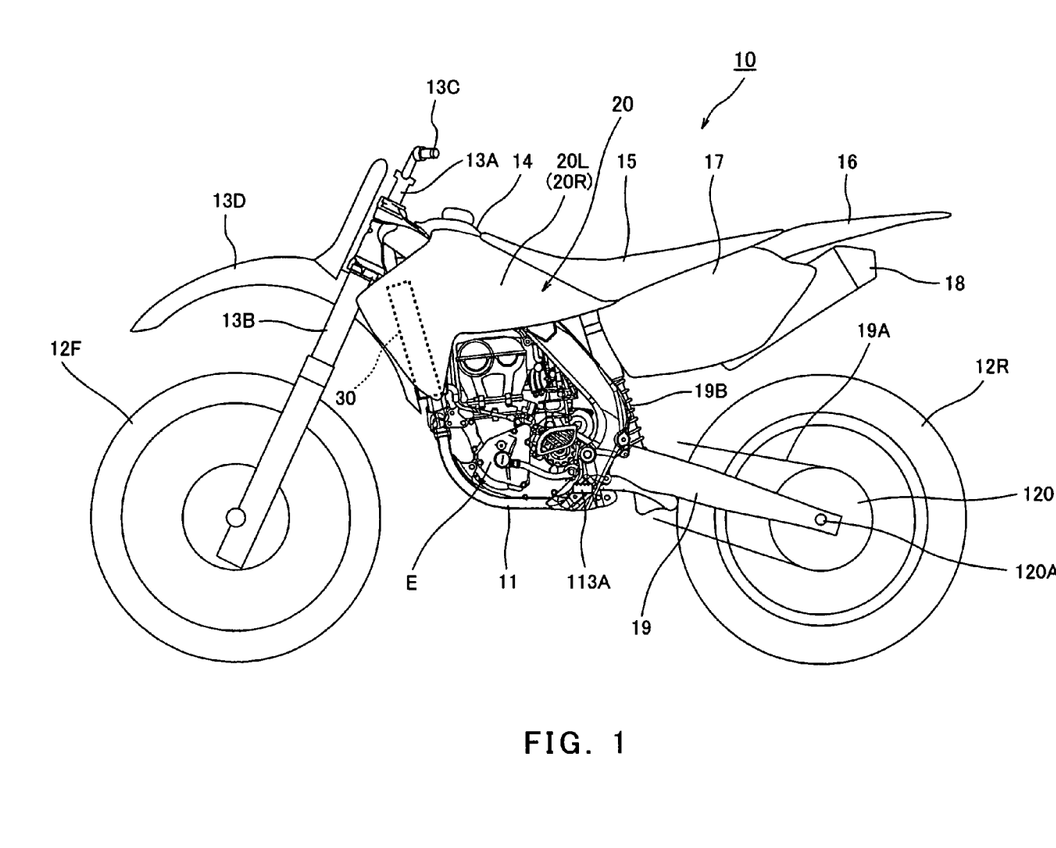
FIG. 1 is a left side view of an off-road motorcycle according to an embodiment of the present invention.

FIG. 1 is a left side view showing the motorcycle 10. The motorcycle 10 is of a typical motocross-type. The motorcycle 10 includes an engine E provided on a cradle-type body frame 11. A steering column 13A, which extends substantially in the up-and-down direction, is attached to a front end portion of the body frame 11 so as to be rotatable about the longitudinal axis thereof. From a lower end portion of the steering column 13A, a pair of front forks 13B (only one is shown) extends in a lower direction along the longitudinal axis of the steering column 13A to be in parallel with each other. A front wheel 12F is rotatably supported between lower end portions of the front forks 13B. In a space between upper end portions of the pair of front forks 13B, a front fender 13D that extends in the front-and-rear direction is attached to a lower end portion of the steering column 13A. A handle bar 13C that extends substantially in both the left and right directions is attached to an upper end portion of the steering column 13A.

When an operator (refer to FIG. 10) rotates the handle bar 13C in the right and left directions, the steering column 13A, the front forks 13B and, then, the front wheel 12F are successively rotated in the same direction to steer the motorcycle to the rotated direction of the handle bar 13C.

A fuel tank 14 typically made of synthetic resin is disposed in an upper portion of the body frame 11 and immediately behind the handle bar 13C. A straddle-type seat 15 on which the operator (refer to FIG. 10) seats is provided to appear continuous behind the fuel tank 14. A rear fender 16 is provided further behind the seat 15, extending rearward. From both the right and left sides of a rear half portion of the seat 15, side fenders 17 are provided extending in a lower direction, respectively. A muffler 18 is disposed between the side fenders 17, and connected with exhaust port(s) (not shown) of the engine E located in front of the muffler 18.

A swing arm 19 is pivotably supported by a rear end portion of the body frame 11 at a front end portion thereof so that it is swingable in the up-and-down direction. A rear portion of the swing arm 19 horizontally splits in two portions so that the two portions accommodate and rotatably support a rear wheel 12R therebetween. A rear axle 120A of the rear wheel 12R is provided with a driven sprocket 120 thereon, and the sprocket 120 is cooperatively coupled with an output shaft (not shown) of the engine E by a chain 19A so that a driving force from the engine E is transmitted to the driven sprocket 120 through the chain 19A, and thereby rotates the rear wheel 12R. A suspension unit 19B including a spring-damper mechanism is provided between the swing arm 19 and the body frame 11 to connect the swing arm 19 and the body frame 11 with a spring-damper action.

Figure 2:
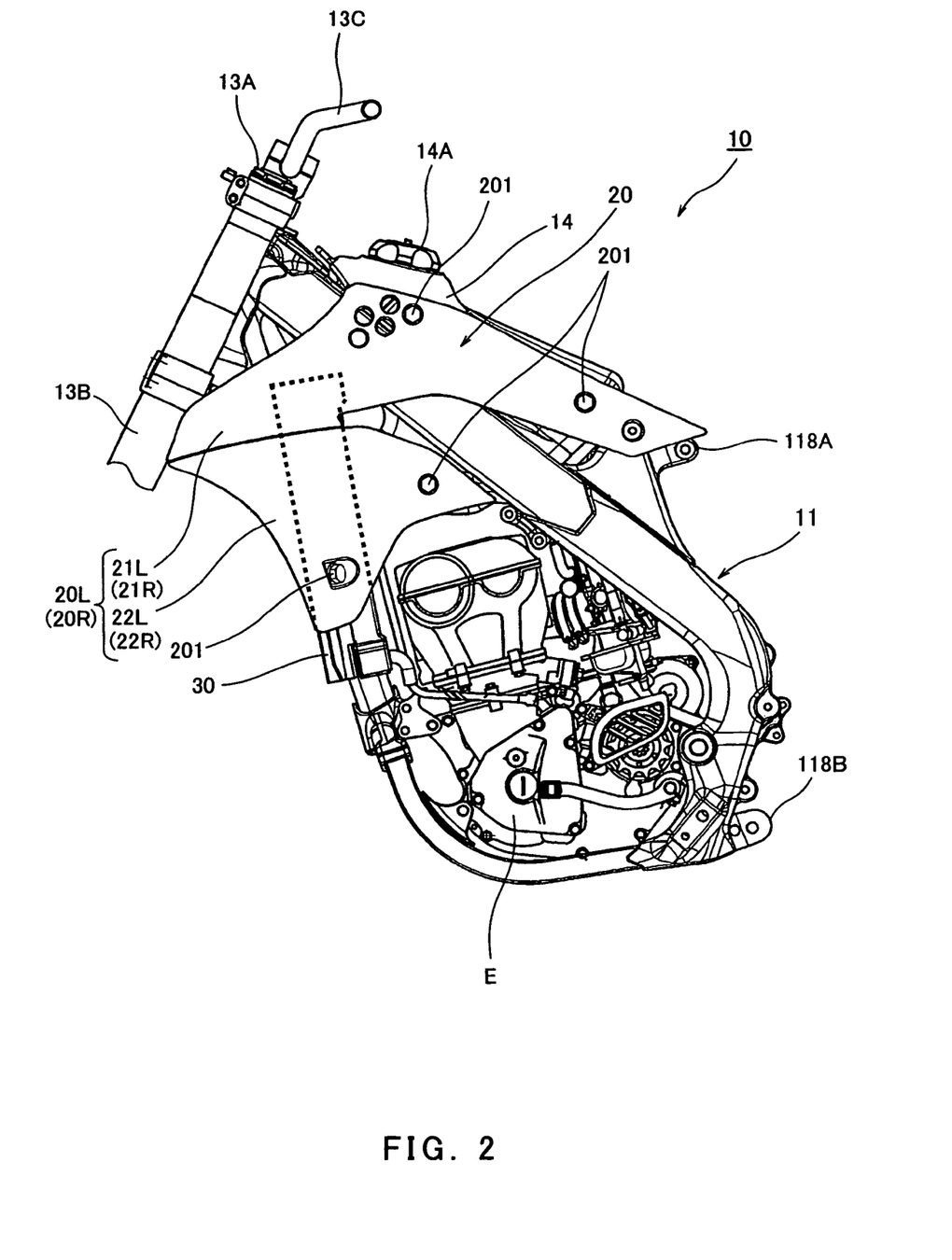
FIG. 2 is an enlarged view of FIG. 1, showing a configuration of a shroud of the motorcycle.

As shown in detail in FIG. 2, a radiator 30 is disposed below the fuel tank 14. Both right and left side faces of the fuel tank 14 and both right and left side faces of the radiator 30 are covered by the shroud assembly 20. In this embodiment, the shroud assembly 20 includes two discrete parts, right-side shroud 20R and left-side shroud 20L, that are mirror symmetrical shape with respect to the longitudinal center of the motorcycle 10, and cover the respective side face of the fuel tank 14 and radiator 30. In FIGS. 1 and 2, only the left-side shroud 20L is illustrated, and also hereinafter, only the left-side shroud 20L may be illustrated or explained for convenience, while the right-side shroud and its components are indicated with a character "R".

Figure 7:
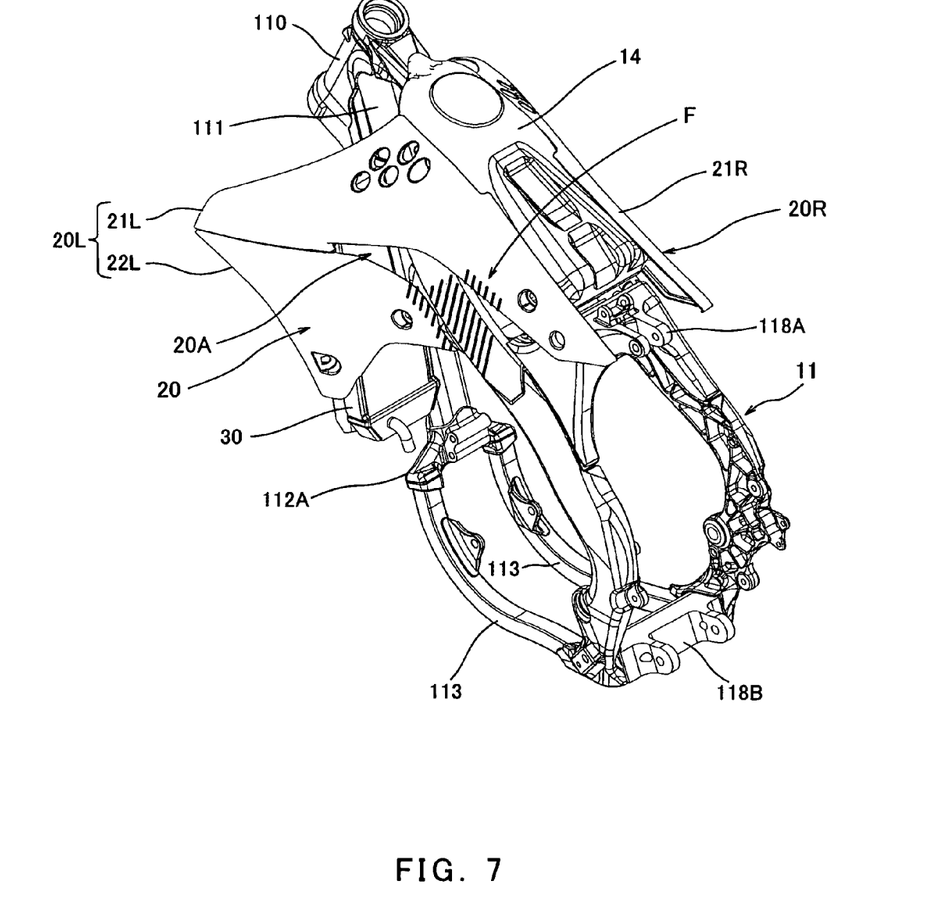
FIG. 7 is a perspective view of the motorcycle from the rear left, showing an arrangement of the shroud covering the fuel tank and the radiator shown in FIGS. 5 and 6.

Referring also to FIG. 7, a pair of front portions of the right and left side shrouds 20L and 20R, that extend forward in front of the radiator 30, are formed in shapes such that they spread widely to the right and left. Thus, the wide-spread pair of front portions are configured so that they do not disturb the front fender 13D (refer to FIG. 1) to rotate with the front wheel, while they facilitate more air intake into the radiator 30.

Typically, the shroud assembly 20 is formed in a shape such that it covers from above the Engine E, but does not cover the side faces of the engine E, and does not disturb cooling of the engine E. Further in this embodiment, each of the shrouds 20L and 20R on the right and left sides is configured so that it can be separated into an upper part and a lower part at a height of an upper portion of the radiator 30. In this embodiment, the separating line of each of the shrouds 20L and 20R extends substantially in the front-and-rear direction. As used herein, the separable upper and lower parts of the shroud 20L(20R) are referred to as an "upper shroud part" 21L(20R) and "lower shroud part" 22L(22R), respectively, for convenience (refer to FIG. 2).

Before explaining the more detailed configuration of the shroud assembly 20, a configuration of the body frame 11 will be explained hereinafter.

Figure 3:
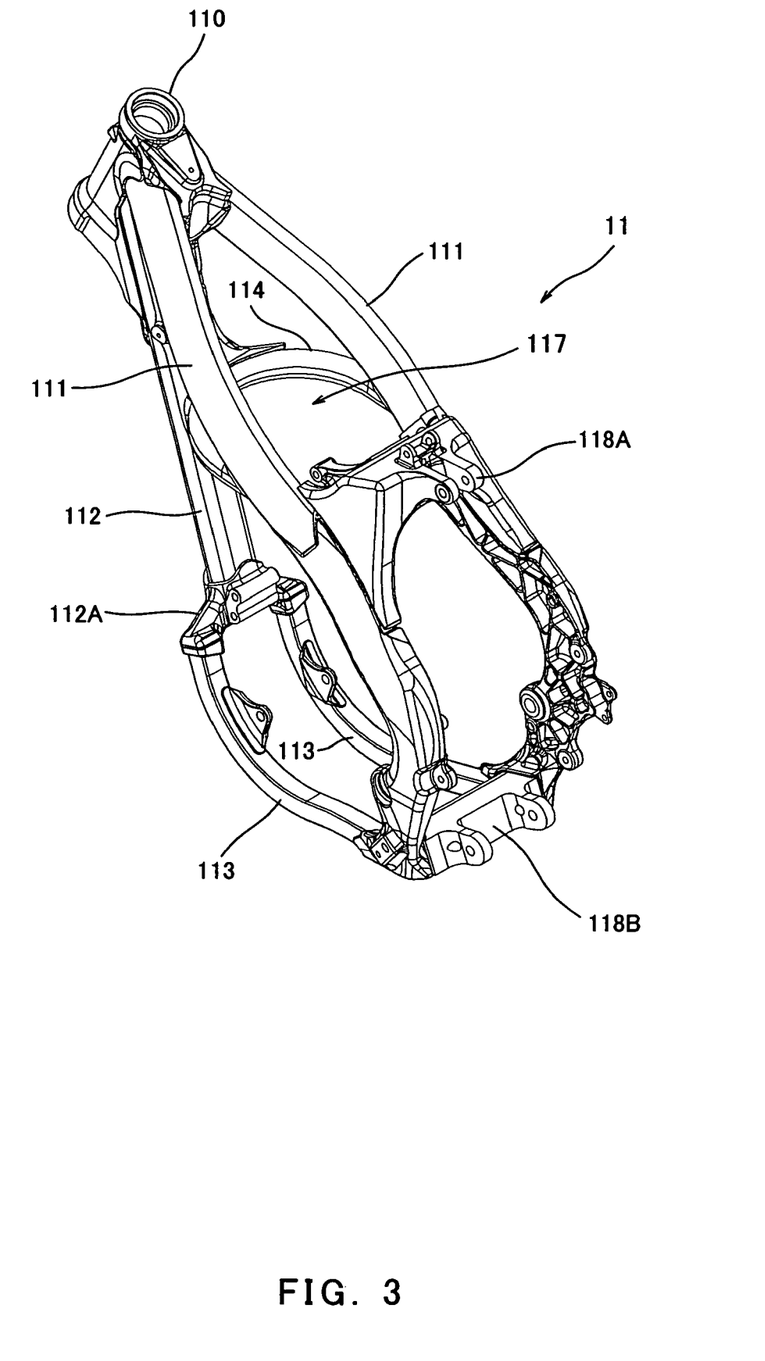
FIG. 3 is a perspective view from the rear left, showing a frame structure of the motorcycle of FIG. 1.
Figure 4:
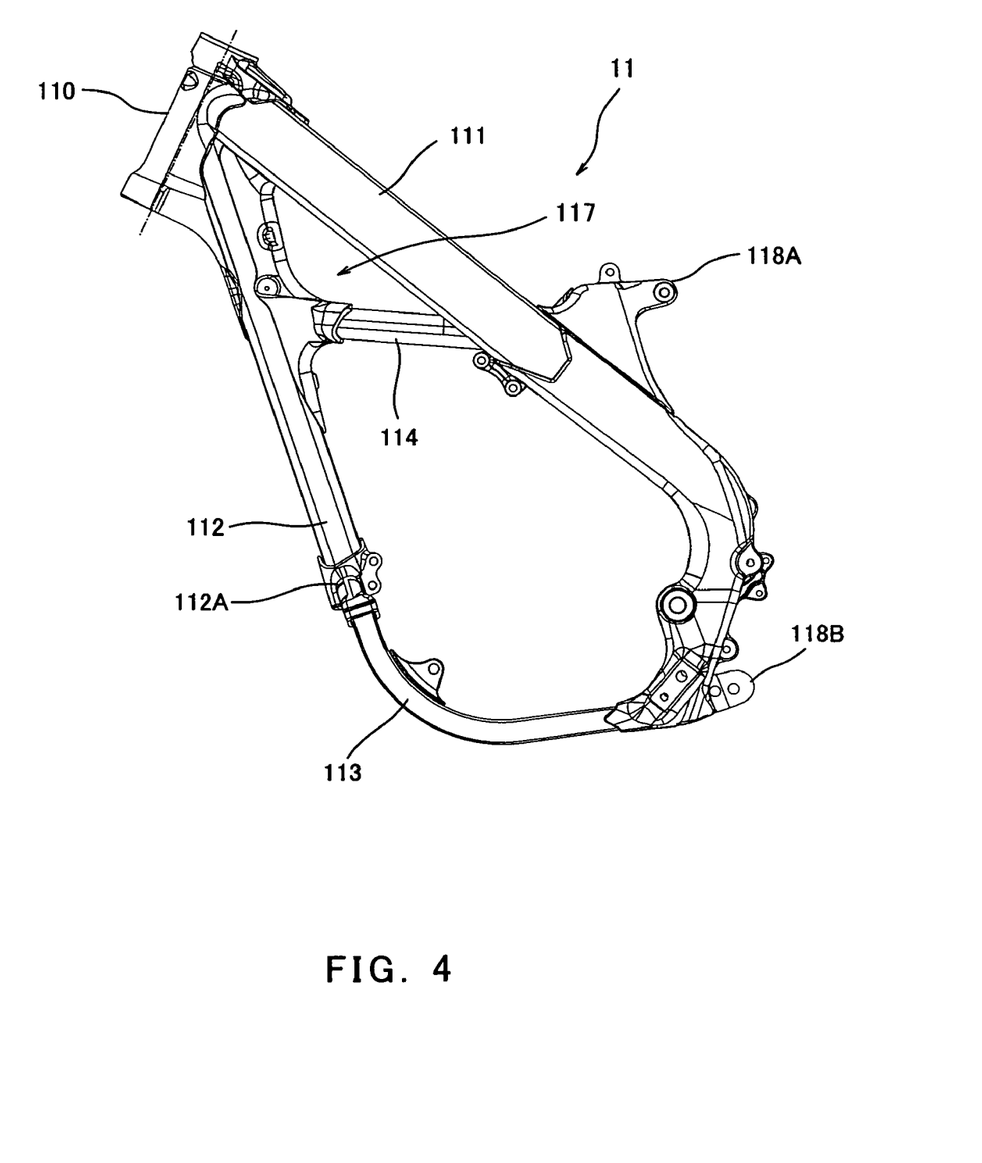
FIG. 4 is a left side view of FIG. 3.

With reference to FIG. 3, and FIG. 4, which is a side view of FIG. 3, the body frame 11 includes a head pipe 110, a pair of main pipes 111, a down tube 112, a pair of lower frames 113, and a cross pipe 114. The head pipe 110 that rotatably supports the steering column 13A (refer to FIGS. 1 and 2) extends substantially in the up-and-down direction and slightly inclines to the rear. The pair of main pipes 111 extend from an upper peripheral surface of the head pipe 110 to rear and lower directions so as to spread to the left and right directions with some angle therebetween. Rear and lower portion of the main pipes 111 extend approximately in parallel with each other, and rear and lower end portions of the main pipes 111 are slightly curved to the front. In this embodiment, each of the main pipes 111 has a rectangular cross-section.

The reference numeral "118A" represents a bracket portion of the body frame 11 configured to connect with an upper end portion of the suspension unit 19B. The reference numeral "118B" represents a bracket portion of the body frame 11 that swingably supports the front end portion of the swing arm 19.

From a lower peripheral surface of the head pipe 110, a down tube 112 extends to a lower direction, and is coupled to the pair of lower frames 113 through a bracket 112A. The lower frames 113 extend downwardly and bend to the rear, while being in parallel with and horizontally spaced apart from each other. The lower frames 113 are coupled to the lower end portions of the main pipes 111 through the bracket 118B mentioned above.

A cross frame 114, that is U-shaped, is coupled to the main pipes 111 at each end, and a center portion of the cross frame 114 is coupled to an intermediate portion of the down tube 112. The cross frame 114 extends substantially in a horizontal plane and at approximately the same height as the bracket 118A in this embodiment.

Figure 5:
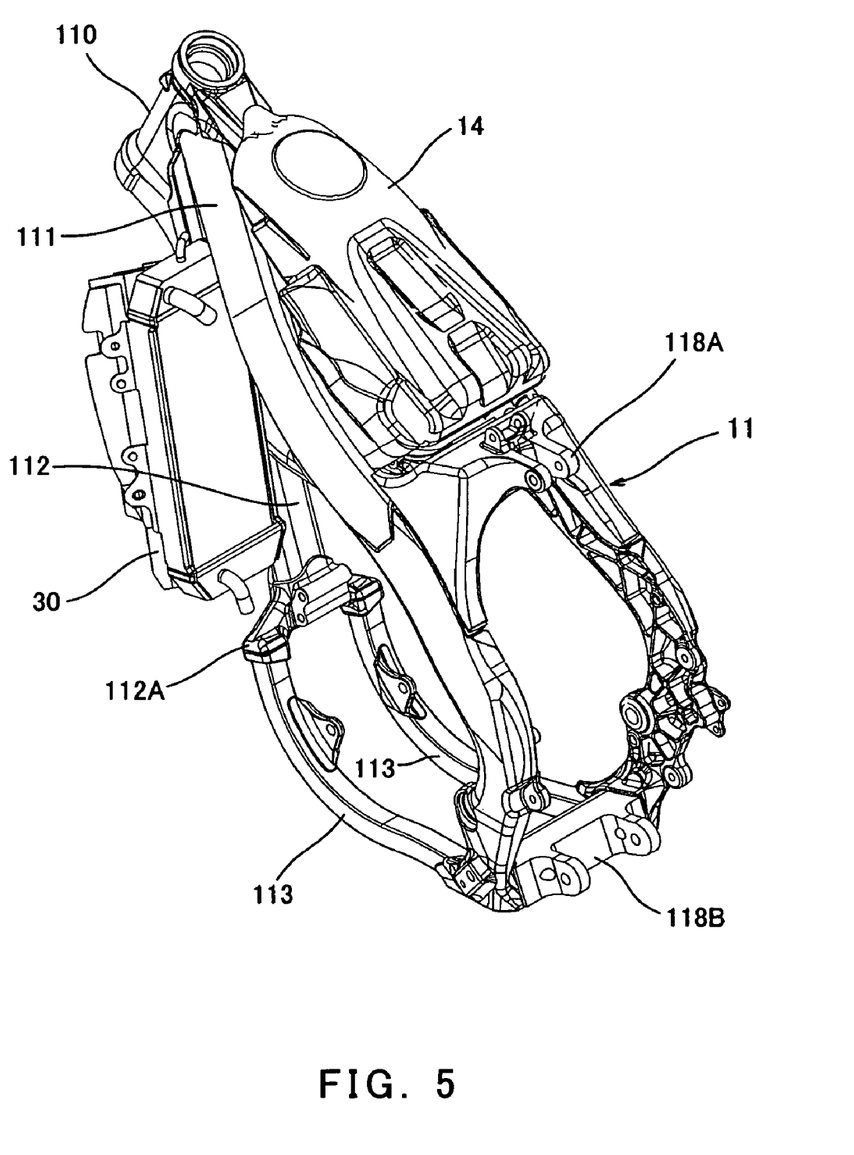
FIG. 5 is a perspective view of the motorcycle from the rear left, showing an arrangement of a fuel tank and a radiator on the frame structure shown in FIGS. 3 and 4.
Figure 6:
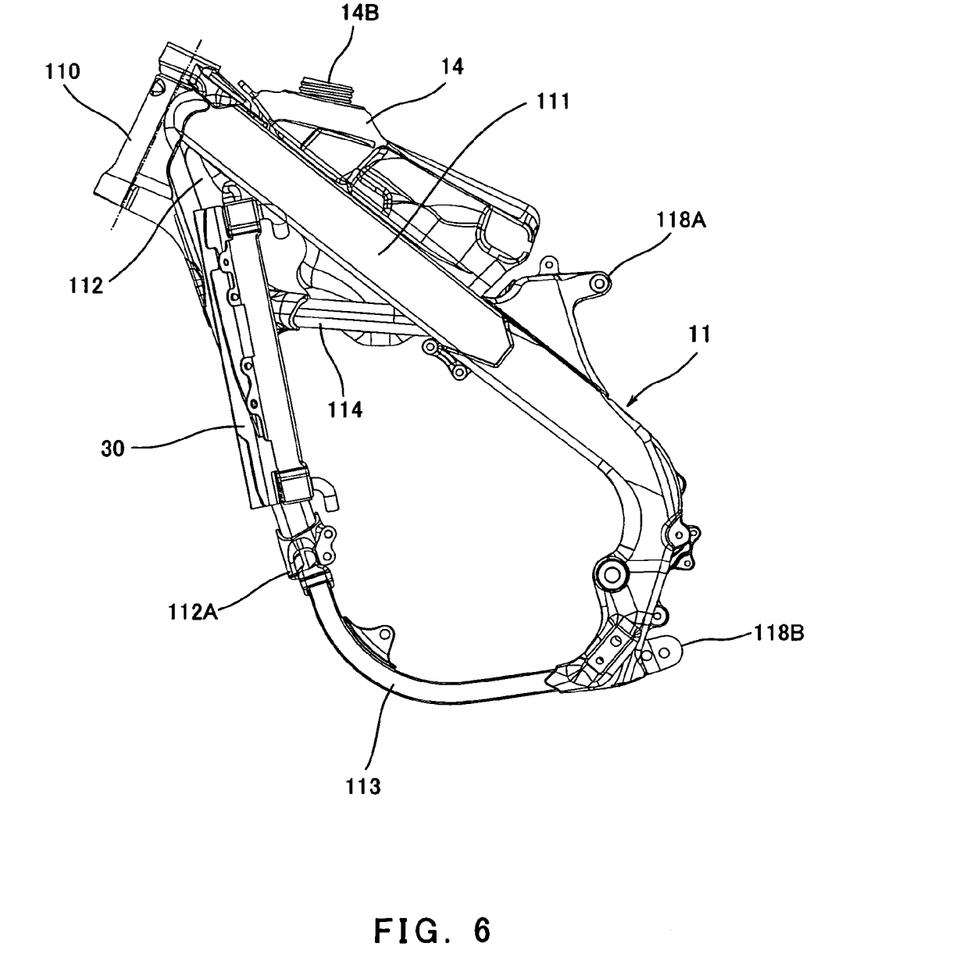
FIG. 6 is a left side view of FIG. 5.

Next, referring to FIG. 5, and FIG. 6, which is a side view of FIG. 5, an arrangement of the fuel tank 14 and the radiator 30 will be explained with respect to the body frame 11.

The fuel tank 14 is accommodated in a space 117 (refer to FIGS. 3 and 4) defined by the pair of main pipes 111, the down tube 112, and the cross pipe 114. The space 117 is configured to be in a shape in which the side faces of the fuel tank 14 do not protrude sideward from the main pipes 111 and the cross pipe 114. Although a threaded portion 14B of a tank cap 14A (refer to FIG. 2) is illustrated in FIG. 6, the threaded portion 14B is not illustrated in FIG. 5 for convenience.

In this embodiment, the radiator 30 is arranged along the left side face of the down tube 112. Alternatively, the radiator 30 may be arranged on the right side of the down tube 112 and, alternatively, two radiators may be arranged on both the right and left sides of the down tube 112. Accordingly, in this embodiment, although a single radiator 30 only on the left side is illustrated, both the right and left shroud parts are typically in a mirror symmetrical shape with respect to the longitudinal center of the motorcycle 10.

Figure 8:
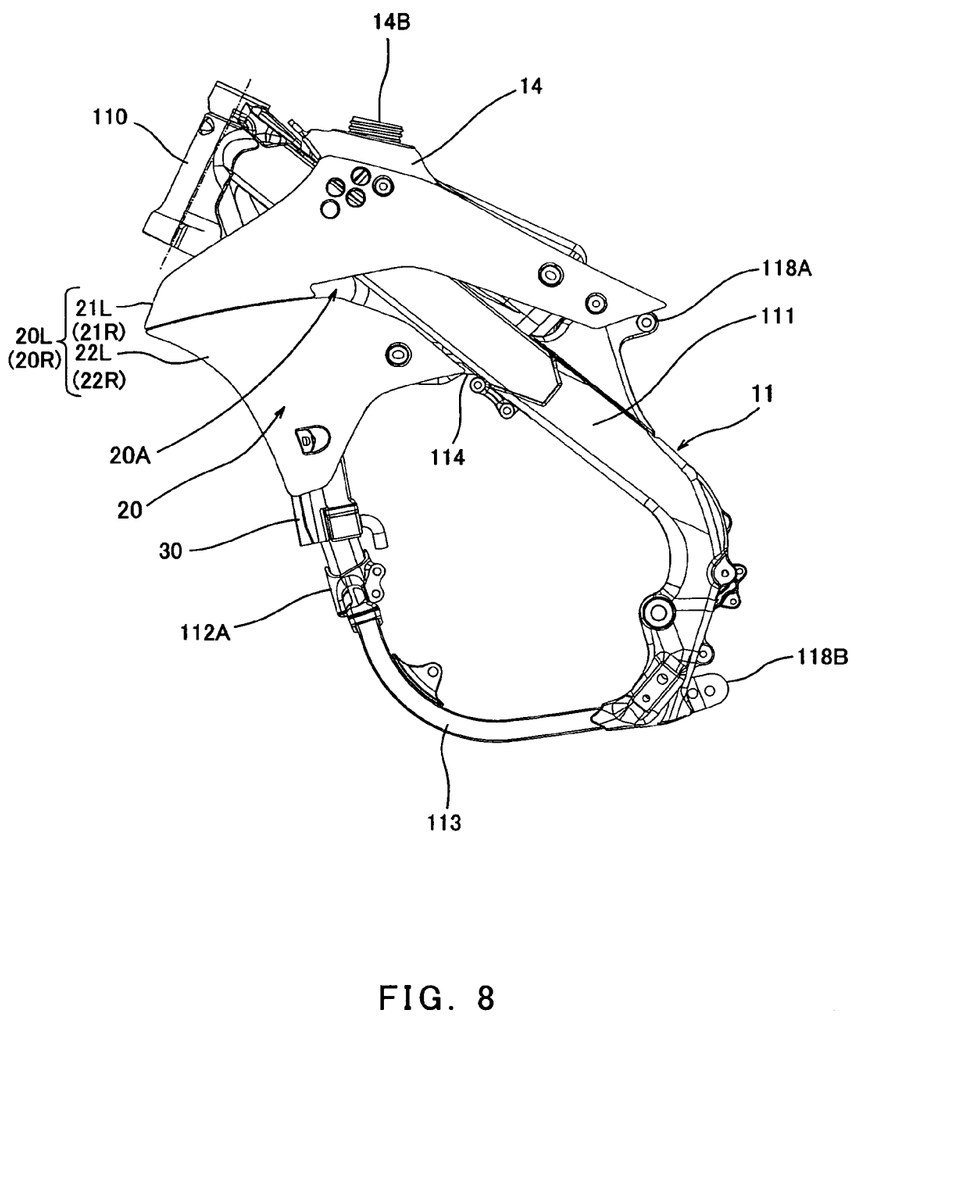
FIG. 8 is a left side view of FIG. 7.

Next, referring to FIG. 7, and FIG. 8, which is a side view of FIG. 7, an arrangement of the shroud assembly 20 will be explained in detail.

As mentioned above, in this embodiment, each of the shrouds 20L and 20R on the right and left sides includes the upper shroud part 21L and 21R, and the lower shroud part 22L and 22R. As for the left side, the upper shroud part 21L extends from in front of an upper portion of the radiator 30 through a side face of an upper portion of the radiator 30, through a side face of the main pipe 111, and to a rear side face of the fuel tank 14. Upper and rear portions of the upper shroud part 21L are substantially in close contact with the fuel tank 14, and configured to be in a shape such that a front lower portion thereof spreads sideways toward the front. The larger spreading portion of the upper shroud part 21L is coupled to the lower shroud part 22L at lower end portion thereof.

The lower shroud part 22L extends rearward from in front of the radiator 30, along the side face of the lower portion of the radiator 30, and along the cross pipe 114 to the end of the cross pipe 114. As it extends to lower areas, the lower shroud part 22L is made to be narrower and come in close contact with the radiator 30. From a lower portion to a rear portion of the lower shroud part 22L, a lower edge of the lower shroud 22L is concavely curved.

In this embodiment, the upper shroud part 21L and the lower shroud part 22L are coupled to each other only by front portions thereof. Rear portions of the shroud parts 21L and 22L are formed with a gap 20A such that a portion of the main pipe 111 corresponding to the gap 20A is exposed to the shroud exterior. As more clearly shown in FIG. 7, the exposed portion of the main pipe 111 through the gap 20A is protruded outwardly so that it forms substantially a continuous surface F (shown with slashed lines in FIG. 7) with the side face of the main pipe 111, the rear lower portion of the upper shroud part 21L, and the rear portion of the lower shroud part 22L, to ensure a strength against knee-grip by the operator (refer to FIG. 10). Although this will be explained later in detail, in practice, the knee-grip may be mainly made in an area that is constituted by the rear lower portion of the upper shroud part 21L and the side face of the main pipe 111.

Figure 9:
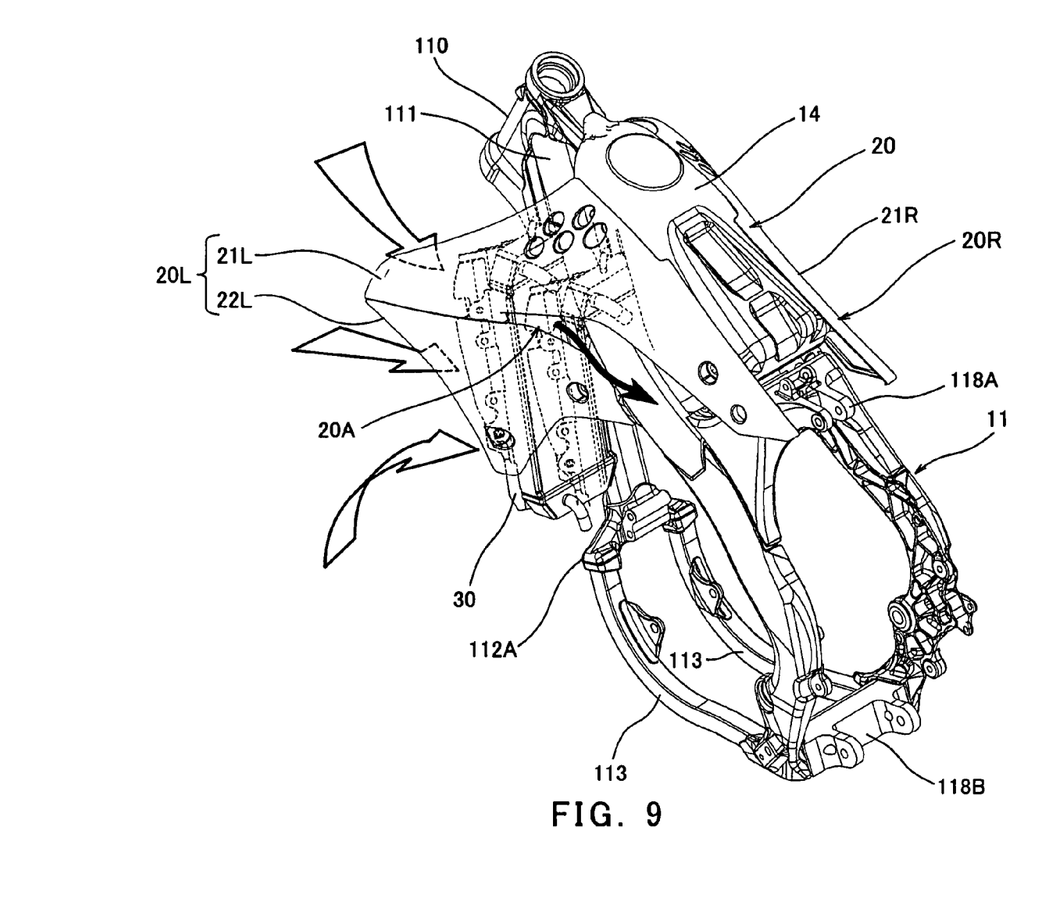
FIG. 9 is a perspective view of the motorcycle from the rear left, showing a ventilation route from the radiator through the shroud shown in FIGS. 7 and 8.

As shown in FIG. 9, a front portion of the gap 20A extends forward beyond corresponding part of the main pipe 111. Air that approaches the radiator 30 from the front as shown with outlined arrows in FIG. 9 passes through a heat-exchanging portion (not shown) of the radiator 30, through a space surrounded by the front portion of the shroud 20L and, then, is discharged mainly from the front portion of the gap 20A to the shroud exterior as shown with a black arrow in FIG. 9.

Figure 10:
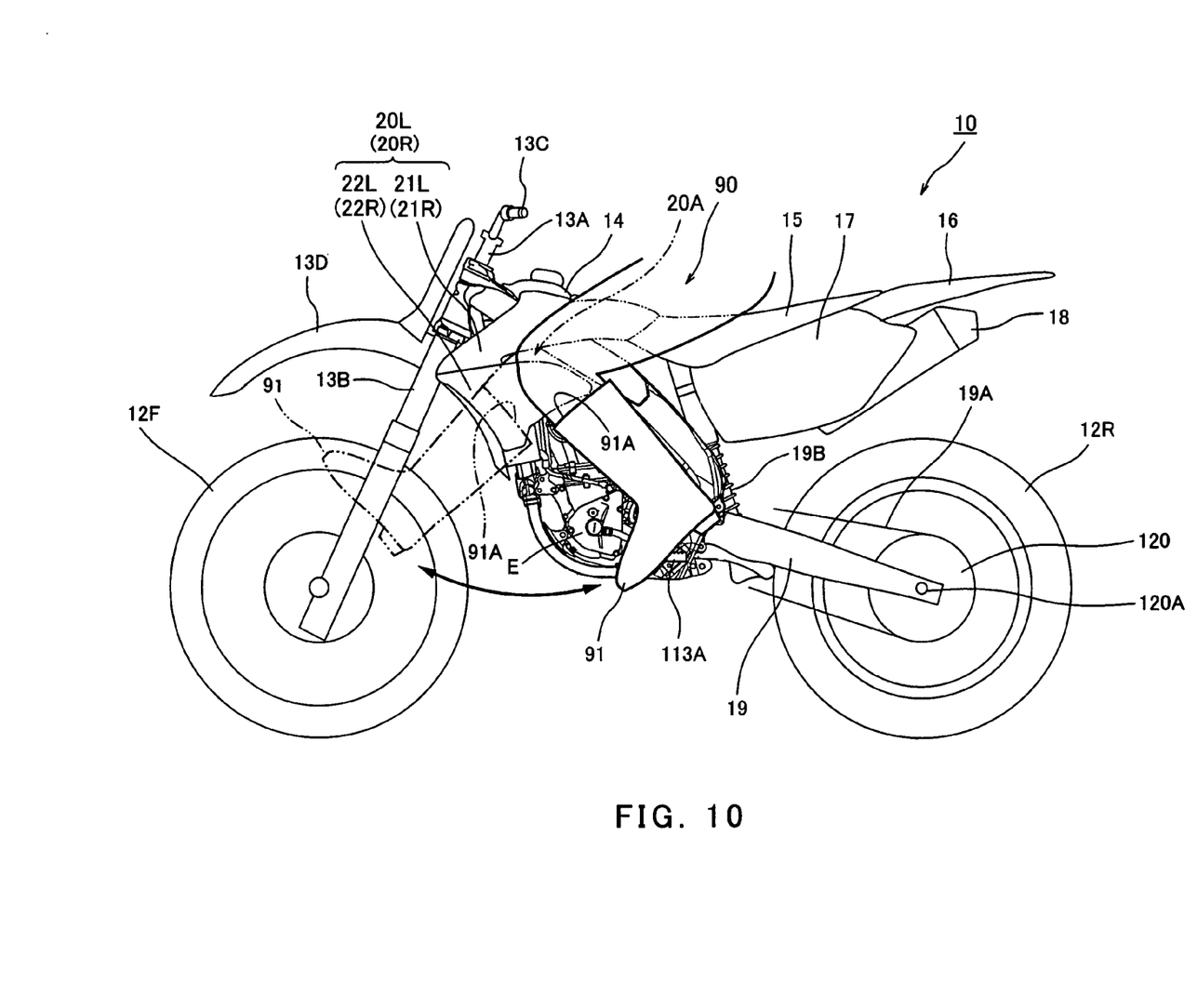
FIG. 10 is a left side view of the motorcycle shown in FIG. 1, illustrating a riding posture of an operator of the motorcycle.

In FIG. 10, a typical example of regular riding posture in which the operator 90 seats on the seat 15 and put his/her the legs on a pair of footrests 113A is shown with solid lines. The footrest 113A is located at below and behind the engine E, and is attached to the coupled portion between the main pipe 111 and corresponding lower frames 113.

When the operator 90 is in the regular riding posture, the operator 90, as explained with respect to FIG. 7, knee-grips mainly the fuel tank 14 through the upper shroud part 21L, particularly through the rear lower portion of the upper shroud part 21L (as well as the side face of the main pipe 111 exposed from the gap 20A). At this point, an upper edge 91A (herein, particularly referred to as an inner side toward the motorcycle body) of boot 91, which the operator 90 typically wears, is located below the upper shroud part 21L so that it does not contact a lower edge of the upper shroud part 21L, and does not disturb a change in the riding posture, particularly a movement of the thigh region or higher of a body of the operator 90.

Further, assume that the operator 90 changes his/her posture from the above-mentioned regular riding posture to another posture, for example, in which the operator 90 extends his/her leg(s) forward. Such a posture is shown with dashed lines in FIG. 10, and this posture is typically used by the operator 90 when he/she stretches one leg against the ground while turning around a corner. In this case, in fact, the motorcycle 10 typically inclines toward an inside of the turn. In this posture, the upper edge 91A of the boot 91 may be located in the front portion of the lower shroud part 22L. However, due to the shape of the lower edge of the lower shroud part 22L, the upper edge 91A of the boot 91 does not contact with the lower edge of the lower shroud part 22L to allow a smooth change in the riding posture by the operator 90.

Figure 11:
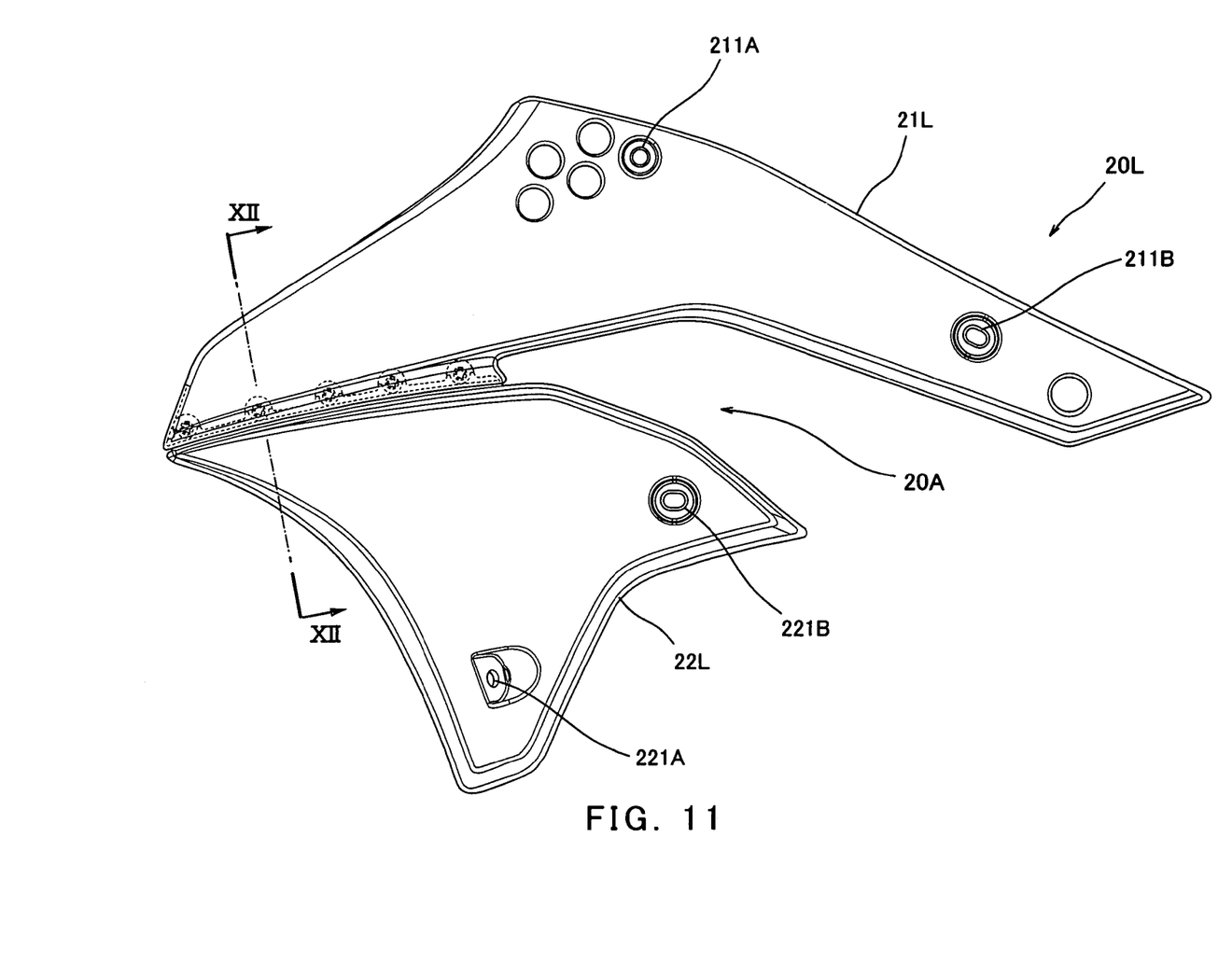
FIG. 11 is a detailed view of the shroud of FIG. 2, particularly showing a coupled portion of an upper shroud and a lower shroud.

As shown in FIG. 11, the upper and rear portions of the upper shroud part 21L that are in contact with the fuel tank 14 (refer to FIG. 7) are formed with two openings 211A and 211B spaced apart to each other in the front-to-rear direction. Typically, the holes 211A and 211B are located to correspond to a front end portion and a rear end portion of the fuel tank 14, respectively. The corresponding portions of the fuel tank 14 to the holes 211A and 211B are typically formed so as to have a greater thickness than the other part, and formed with threaded holes (not shown).

Similarly, also referring to FIG. 2, a hole 221A is formed in the lower portion of the lower shroud part 22L, corresponding to the lower portion of the radiator 30. A hole 211B is formed in a rear portion of the lower shroud part 22L, corresponding to the rear end portion of the cross pipe 114.

As shown in FIG. 2, two screws 201 are threadedly engaged into the holes 211A and 211B of the upper shroud part 21L to detachably attach the upper shroud part 21L to the fuel tank 14. Similarly, two screws 201 are threadedly engaged into the holes 221A and 221B of the lower shroud part 22L to detachably attach the lower shroud part 22L to the radiator 30 and the cross pipe 114, respectively.

Figure 12:
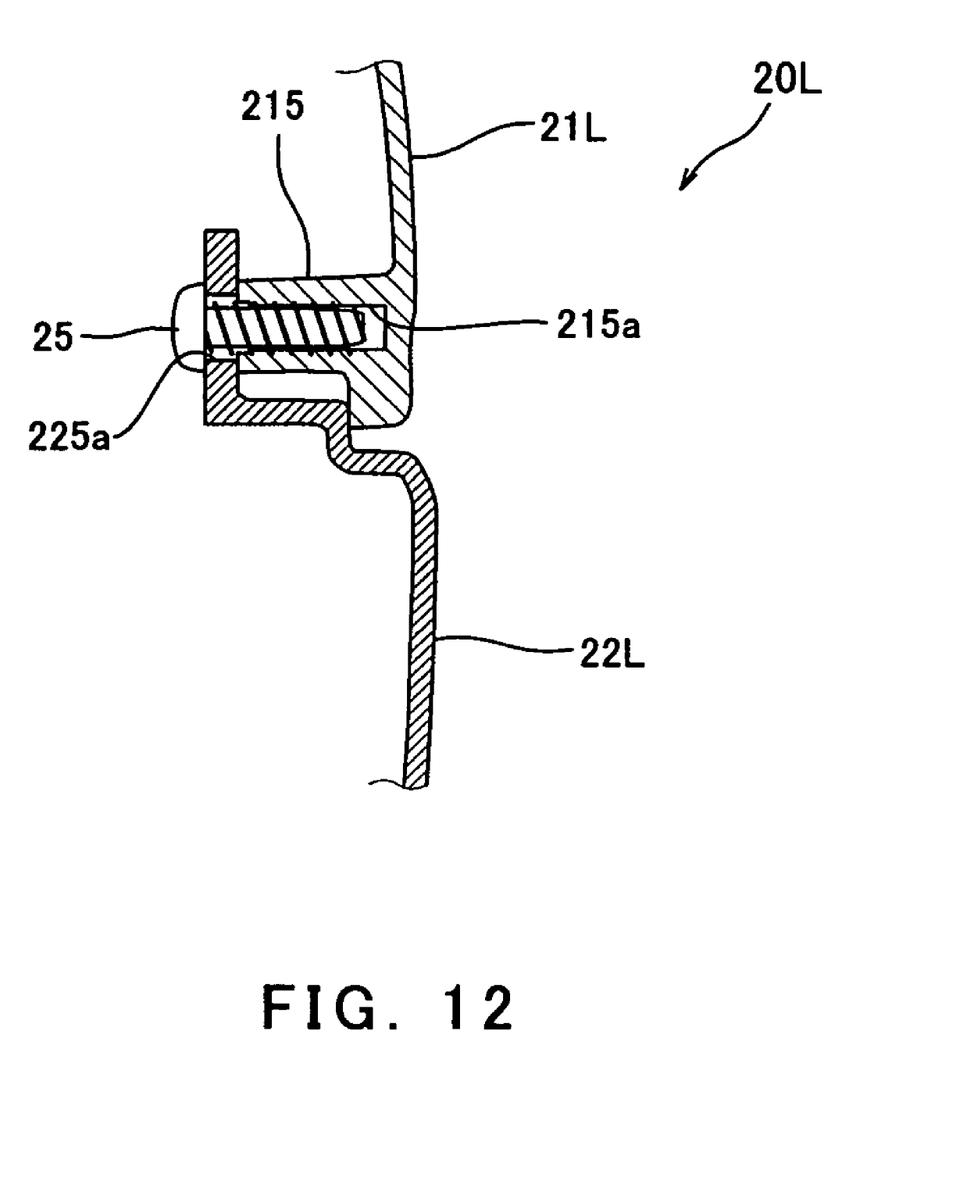
FIG. 12 is a cross-sectional view taken along a line XII-XII of FIG. 11, showing the coupled portion of the upper and lower shrouds.

A coupled portion (or the separating line) between the front portion of the upper shroud part 21L and the front portion of the lower shroud part 22L is shown as a cross-section in FIG. 12. Referring to FIGS. 11 and 12, a plurality (in this embodiment, five, as shown with dashed lines in FIG. 11) of boss portions 215 are intermittently formed so that they protrude inside toward the motorcycle body typically from a position above the lower edge of the front portion of the upper shroud part 21L, along this lower edge. A threaded hole 215a is formed in each of the boss portions 215 from inside.

The upper edge of the front portion of the lower shroud part 22L is bent inside to be formed in a crank-like shape such that it accommodates the lower edge of the front portion of the upper shroud part 21L. A portion of the upper edge of the front portion of the lower shroud part 22L further extends inward and upward to cover the threaded holes 215a of the boss portion 215 from inside. This covering portion is formed with through holes 225a corresponding to the threaded holes 215a formed in the boss portions 215.

As described above, the upper portion of the front portion of the lower shroud part 22L is configured to be inserted inside the upper shroud part 21L from below, and fixed to the upper shroud part 21L by fastening the screws 25 inserted into the threaded holes 215a of the upper shroud part 21L through the through holes 225a of the lower shroud part 22L.

In this embodiment, the shroud 20L is configured so that the upper shroud part 21L and the lower shroud part 22L are coupled by screws 25 from inside in order to provide a better external appearance of the shroud 20L. Alternatively, the upper and lower shroud parts 21L and 22L may be coupled by screws from outside. Moreover, the coupling may be any other known simple method without limiting to screws. It is appreciated by those skilled in the art that the number of the screws may be any suitable number.

As mentioned above, since the shroud 20L is configured to be dividable into a plurality of parts (such as the upper shroud part 21L and the lower shroud part 22L), it may not be necessary to replace the whole shroud 20L when only either of the upper shroud part 21L or the lower shroud part 22L is damaged by, for example, a motocross race. Rather, screws 25 may be removed, to detach the damaged shroud part, and the reverse procedure may be performed to attach a new shroud part.

This multiple-part structure may improve the flexibility in ornament of the shroud assembly 20 and easiness of responding to a design change, etc. In addition, individual coloring of each shroud part by paint may be easily possible. Thus, when the boot of the operator 90 scratches the paint on the shroud, only the scratched shroud part may be replaced with a new one.

In the above embodiment, although the motocross-type motorcycle has been described as one example of a vehicle, the present invention may be applicable to other type of motorcycle such as a road-race type, as well as may be applicable to any other type of vehicles, such as All Terrain Vehicles (or ATVs). Further, the separating line or coupled line of the shroud parts may extend in any direction other than the longitudinal direction of the vehicle.

As the invention may be embodied in several forms without departing from the spirit of essential characteristics thereof, the present embodiments are therefore illustrative and not restrictive, since the scope of the invention is defined by the appended claims rather than by the description preceding them and all changes that fall within the metes and bounds of the claims, or equivalence of such metes and bounds thereof are therefore intended to be embraced by the claims.

What is claimed is:

1. A shroud of an off-road motorcycle, the motorcycle being provided with a fuel tank disposed in an upper front portion of a motorcycle body, the shroud comprising:
    an upper shroud that extends along a side face of the fuel tank and covers the side face of the fuel tank; and
    a lower shroud disposed below the upper shroud;
    wherein the upper and lower shrouds are detachably coupled to each other; and
    wherein the upper and lower shrouds are coupled to each other in front portions thereof, and are provided with a gap formed in rear portions thereof so that the rear portions of the upper and lower shrouds are spaced apart from each other in an up-and-down direction.

2. The shroud of claim 1, wherein the motorcycle further includes a radiator disposed below the fuel tank, and wherein the lower shroud covers a side face of the radiator.

3. The shroud of claim 2, wherein the motorcycle body includes:
    a head pipe;
    a pair of main pipes that are coupled to the head pipe at front ends thereof, and extend in rear and lower directions so as to be spaced apart from each other;
    a down tube that is coupled to the head pipe at a front end thereof, and extends in a lower direction;
    a pair of lower frames that are coupled to a lower end portion of the down tube in a front end portion thereof, extends in a rear direction, and is coupled to rear end portions of the pair of main pipes; and
    a cross pipe that couples an intermediate portion of the down tube to intermediate portions of the pair of main pipes;
    wherein the radiator is disposed along the down tube;
    wherein the fuel tank is disposed in a space formed by the pair of main pipes, the down tube, and the cross pipe;
    wherein the upper shroud covers an upper portion of the radiator and substantially the whole side face of the fuel tank, traversing the main pipe; and
    wherein the lower shroud extends rearward from a lower portion of the radiator along the cross pipe, traversing the down tube.

4. The shroud of claim 3, wherein a coupled portion of the upper and lower shrouds extends substantially in the front-and-rear direction.

5. The shroud of claim 3, wherein a portion of the main pipe corresponding to the gap is exposed to the shroud exterior and forms substantially a continuous surface with surfaces of the shroud.

6. The shroud of claim 1, wherein the gap is configured to have a sufficient size that is able to discharge air flowing from a space surrounded by the shroud to the shroud exterior through the radiator.

7. The shroud of claim 1, wherein the motorcycle further includes:
   a straddle seat arranged behind the fuel tank;
   an engine disposed below the seat; and
   a pair of footrests disposed below and behind the engine;
   wherein the upper shroud is arranged in a position at which an operator of the motorcycle can knee-grip the fuel tank through the upper shroud in a regular riding posture in which the operator sits on the seat and places his/her legs on the footrests; and
   wherein the lower shroud is arranged in a position at which a top edge of a boot which the operator wears avoids contact with the lower shroud when the operator extends his/her leg forward from the regular riding posture.

8. The shroud of claim 4, wherein the coupled portion of the plurality of parts is formed as an overlapped portion of the plurality of parts, and the coupled portion is detachably coupled by screws.

9. The shroud of claim 1, wherein the gap is formed such that a portion of a main pipe of the motorcycle body corresponding to the gap is exposed to the shroud exterior.

10. The shroud of claim 9, wherein the motorcycle further includes a radiator; and
    wherein a front of the gap extends forward beyond the corresponding portion of the main pipe.

11. The shroud of claim 9, wherein the exposed portion of the main pipe through the gap is protruded outwardly so that it forms substantially a continuous surface with a side face of the main pipe, a rear lower portion of the upper shroud and a rear portion of the lower shroud.

12. The shroud of claim 9, wherein the motorcycle further includes a radiator;
    wherein a front of the gap extends forward beyond the corresponding portion of the main pipe; and
    wherein the exposed portion of the main pipe through the gap is protruded outwardly so that it forms substantially a continuous surface with a side face of the main pipe, a rear lower portion of the upper shroud and a rear portion of the lower shroud.

13. The shroud of claim 9, wherein the motorcycle further includes a radiator; and
    wherein the lower shroud is detachably attached to the radiator and a cross pipe of the motorcycle body.

14. The shroud of claim 9, wherein a rear portion of the upper shroud is detachably attached above the main pipe, and a rear portion of the lower shroud is detachably attached below the main pipe.

15. The shroud of claim 2, wherein a coupled portion of the upper and lower shrouds extends substantially in a front-and-rear direction.

16. The shroud of claim 15, wherein the motorcycle body includes:
    a head pipe;
    a pair of main pipes that are coupled to the head pipe at front ends thereof, and extend in rear and lower directions so as to be spaced apart from each other;
    a down tube that is coupled to the head pipe at a front end thereof, and extends in a lower direction;
    a pair of lower frames that are coupled to a lower end portion of the down tube in a front end portion thereof extend in a rear direction, and are coupled to rear end portions of the pair of main pipes; and
    a cross pipe that couples an intermediate portion of the down tube to intermediate portions of the pair of main pipes;
    wherein the radiator is disposed along the down tube;
    wherein the fuel tank is disposed in a space formed by the pair of main pipes, the down tube, and the cross pipe;
    wherein the upper shroud covers an upper portion of the radiator and substantially the whole side face of the fuel tank, traversing the main pipe; and
    wherein the lower shroud extends rearward from a lower portion of the radiator along the cross pipe, traversing the down tube.

* * * * *